United States Patent [19]

Bury

[11] Patent Number: 4,525,930
[45] Date of Patent: Jul. 2, 1985

[54] APPARATUS FOR CARRYING MACHINE ELEMENTS

[75] Inventor: James Bury, Derby, England

[73] Assignee: L.K. Tool Company Limited, Derbyshire, England

[21] Appl. No.: 348,547

[22] Filed: Feb. 12, 1982

[30] Foreign Application Priority Data

Feb. 14, 1981 [GB] United Kingdom ............... 8104696

[51] Int. Cl.³ ........................ G01B 5/03; G01B 7/03
[52] U.S. Cl. ............................. 33/1 M; 33/DIG. 2;
308/3 A; 33/572; 33/556
[58] Field of Search ............... 33/1 M, 169 R, 174 R,
33/174 L, DIG. 2; 308/3 R, 3 A, 5 R

[56] References Cited

U.S. PATENT DOCUMENTS

| | | | |
|---|---|---|---|
| 3,639,993 | 2/1972 | Sartorio | 33/174 R |
| 3,749,501 | 7/1973 | Wieg | 33/1 M |
| 3,831,283 | 8/1974 | Pagella et al. | 33/DIG. 2 |
| 3,840,993 | 10/1974 | Shelton | 33/1 M |
| 4,138,822 | 2/1979 | Parodi | 33/169 R |

FOREIGN PATENT DOCUMENTS

| | | | |
|---|---|---|---|
| 140079 | 2/1980 | German Democratic Rep. | 33/1 M |
| 621955 | 8/1978 | U.S.S.R. | 33/1 M |
| 658406 | 4/1979 | U.S.S.R. | 33/1 M |
| 648282 | 9/1979 | U.S.S.R. | 33/174 L |

Primary Examiner—Richard R. Stearns
Attorney, Agent, or Firm—Alan H. Levine

[57] ABSTRACT

A dimensional measuring and checking machine mounts a bridge structure (12) on legs (22) which are supported on a base (10) by air bearings. The varying forces due to travel of a probe mounting carriage (24) create vertical displacements of the bearings and movement of the bridge (12) out of alignment. To compensate for this, and thus enable high accuracy measuring, a chain (34) moves with the bridge (12), rotating a spindle (42) at one end of the machine, and thus moving the legs (22) at that end so levers (48) and pivot blocks (52) vary the height of the bridge (12).

9 Claims, 3 Drawing Figures

APPARATUS FOR CARRYING MACHINE ELEMENTS

This invention relates to apparatus for carrying machine elements, and is particularly concerned with high accuracy dimensional measuring and checking machines where it is necessary to retain a probe or the like, which is mounted on a movable carriage, accurately located relative to a datum position.

In apparatus of this type, movement of the carriage along a bridge causes variation of the forces acting through leg supports which mount the bridge on a base, generally through air bearings. The effect of the bearing forces is to create slight vertical displacements of the air bearings, thus resulting in vertical movement of the bridge out of the horizontal as the carriage moves from one end to the other. The accuracy required by such machines means that such vertical movement of the bridge is unacceptable. It has been proposed to provide a counterbalance for the weight of the carriage, but this results in extremely large and bulky structures and of course increases undesirably the weight of the bridge structure acting through the leg supports.

According to the present invention there is provided apparatus for carrying machine elements, said apparatus comprising a base, a bridge structure comprising spaced support legs and a bridge extending therebetween, bearings mounting the support legs on the base, carriage means movable on the bridge, and means compensating for the effects on the bearings due to varying forces on the support legs resulting from movement of the carriage means, the compensating means comprising an arrangement effective at an end of the bridge structure for mechanically transmitting movement of the carriage means into a change in height of the bridge structure at or towards said end above the base, independently of the pressure of the bearings.

Preferably, the compensating means is arranged to effect raising of the bridge structure at said end to offset the increase in force applied to the respective support when the carriage means is moved towards said end. The compensating means may be further arranged to offset raising of the bridge structure at the other end due to the respective air bearing when the carriage means is moved away from said other end. Preferably also the bridge structure is downwardly angled from the other end towards said first mentioned end to offset the overall raising of the bridge structure.

Advantageously, the compensating means comprises a flexible endless member movable together with the carriage means and effective to operate a rotary drive, the latter being operatively connected with a lever assembly which is pivotally connected with the respective support for the bridge structure so as to move the latter on operation of the rotary drive by means of the endless member.

An embodiment of the present invention will now be described by way of example only with reference to the accompanying drawings, in which.

Figure 1:
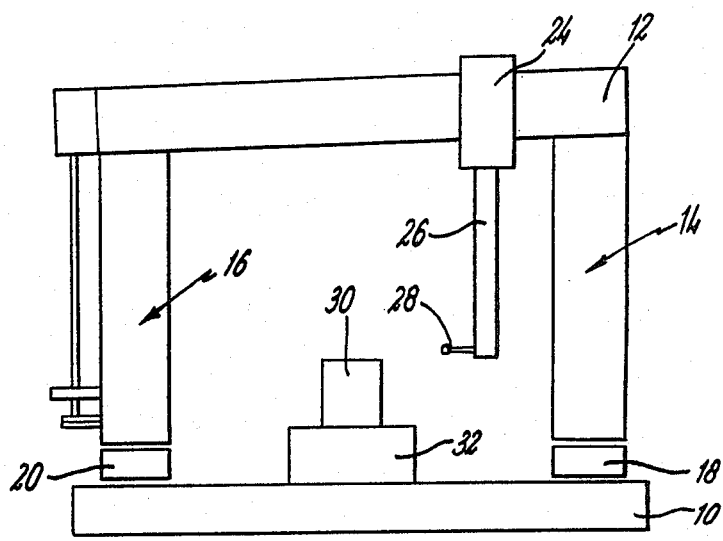
FIG. 1 is a diagrammatic elevation of an apparatus according to the invention.
Figure 3:
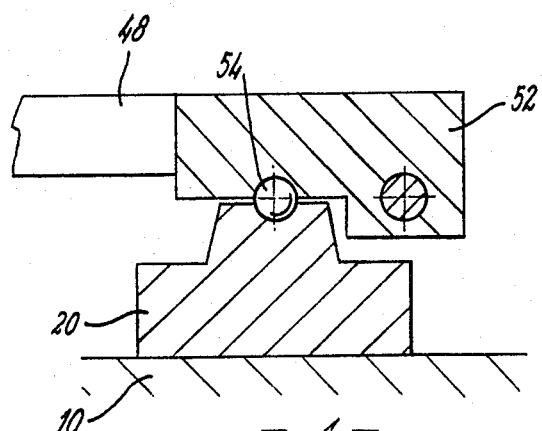
FIG. 3 is a part sectional view to show part of the compensating mechanism.
Figure 2:
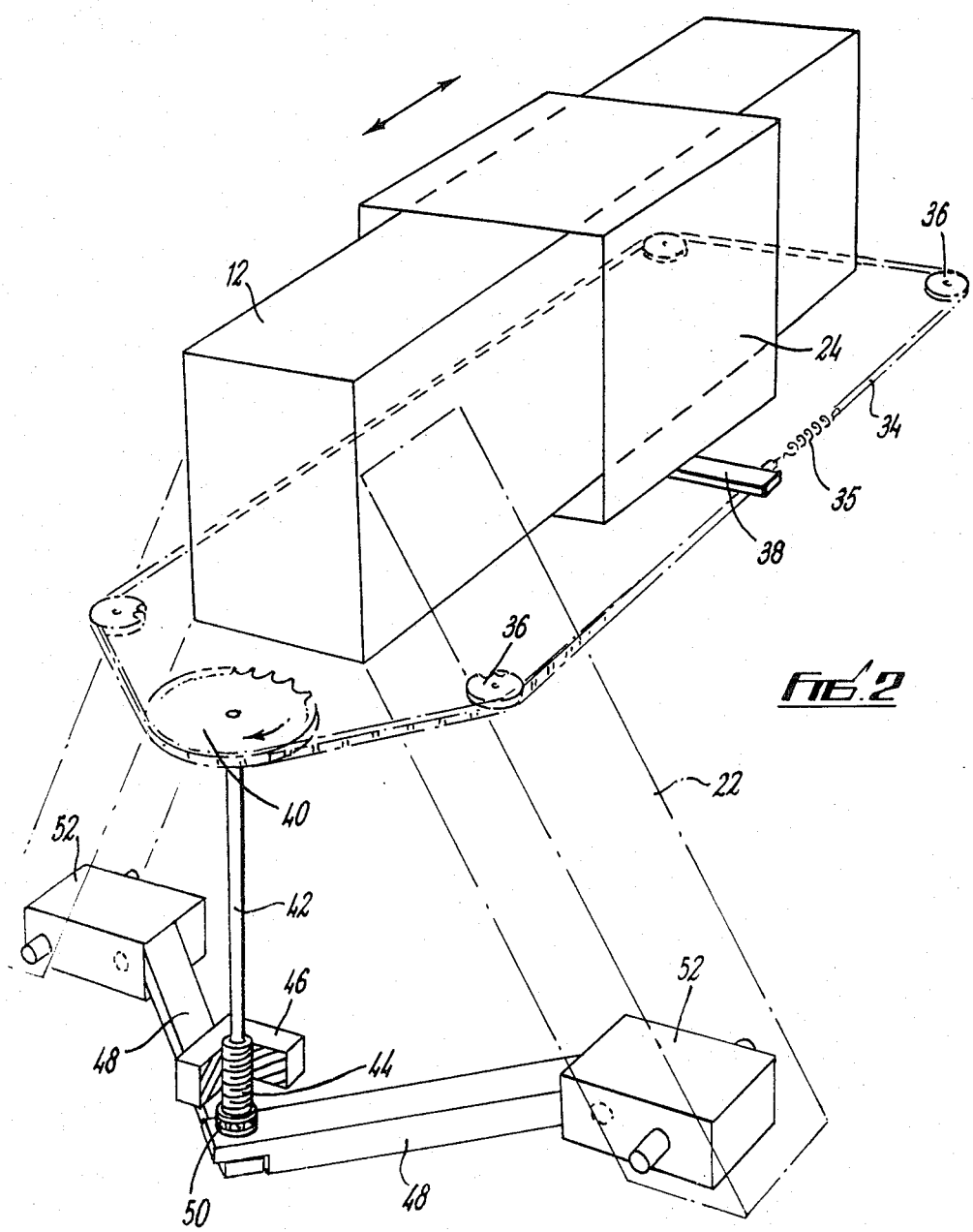
FIG. 2 is a diagrammatic perspective view showing part of the apparatus of FIG. 1.

Referring to the drawings, a high accuracy dimensional measuring and checking machine comprises a base 10, preferably formed of granite, mounting a bridge 12 by means of a pair of spaced leg support structures 14, 16 through respective air bearings 18, 20. Each structure 14, 16 comprises a pair of outwardly divergent legs 22, each of the latter being mounted on the base 10 through an associated one of the air bearings 18 or 20. The bridge 12 is preferably formed of a granite beam and the legs 22 are preferably formed of steel. Mounted for movement along the bridge is a carriage 24 from which there extends downwardly a spindle 26 adapted to mount a probe 28 or the like for co-operating with a workpiece 30 mounted on a support table 32, the latter being supported on the base 10 between the structures 14, 16. The apparatus as described until now is conventional.

The movement of the carriage 24 along the bridge 12 alters the forces applied through the structures 14, 16 on the air bearings 18, 20 and, if no compensating mechanism was provided, the moving weight of the carriage 24 would create a parallelogram type movement on the machine, which moves the bridge 12 and thus the carriage 24 with the spindle 26 and probe 28 out of an arcuate relationship with any datum position.

To offset this misalignment, a compensating mechanism is provided which comprises an endless chain 34 retained by guide sprockets 36 suitably located on a mounting structure (not shown) such that the chain 34 extends around the bridge 12. The chain 34 has a spring tensioner 35 and is connected to an arm 38 mounted at one side of the carriage 24, such that movement of the latter effects movement of the chain 34. At one end of the bridge 12, outwardly of the leg structure 16, the chain 34 is wrapped around a sprocket 40 and the latter has connected thereto, to extend downwardly therefrom a spindle 42 which has an externally threaded part 44 towards its lower end.

The part 44 is located within a threaded nut 46 and at its lower end the spindle 42 mounts respective ends of a pair of arms or levers 48 through a self aligning ball thrust bearing 50. The spindle 42 is located substantially centrally of the legs 22 of the structure 16 and each of the levers 48 extends from the spindle 42 to a lower end of a respective one of the legs 22 and is pivotally mounted on the respective leg 22 through a pivot block 52. Each of the pivot blocks 52 is mounted on the respective air bearing 20 through a sphere 54 which enables the air bearing to be self aligning.

In operation, assuming the carriage 24 to be adjacent to the leg structure 14, the force applied to the respective air bearings 18 by virtue of the additional weight of the carriage 24 is such that the air bearings 18 are pressurised and the bridge 12 with the carriage 24 is subject to downward movement, for example over a distance X. Subsequent movement of the carriage 24 towards the other end of the bridge 12 results in a gradual decrease in the force applied to the air bearings 18, which causes the latter gradually to effect an upward movement of the bridge 12 with the carriage 24 through the distance X. To retain the carriage 24 horizontal it is therefore necessary for the bridge 12 at the end adjacent to the leg structure 16 to be raised not only through the distance X as the carriage 24 reaches the end position, but also to offset downward movement which would otherwise occur due to the increase in pressure on the air bearings 20 as a result of the weight of the carriage 24, for example movement over a distance Y.

Movement of the carriage 24 however effects movement of the chain 34 and this rotates the sprocket 40 and the spindle 42. Rotation of the latter within the nut 46 as the carriage 24 moves towards the leg structure 16, effects a downward movement of the nut 46 and thus the levers 48, and the consequent pivoting of the blocks 52 on the air bearings 20 relative to the legs 22 creates an upward movement of the latter which corresponds to distance X+Y as the carriage 24 reaches its end position. Thus the carriage 24 can be retained horizontal during its movement across the bridge 12. Obviously as the carriage 24 moves in the other direction along the bridge 12, the movement of the chain 34 effects a lowering of the leg structure 16 and the respective end of the bridge 12 to again retain the carriage 24 horizontal.

It will be appreciated that, although the carriage 24 is retained horizontal with such an arrangement, the bridge 12 as a whole is being raised and lowered and thus the height of the carriage 24 above the base 10 is not retained constant as is necessary. To accommodate this, the bridge 12 is downwardly angled from the end adjacent the leg structure 14 to the opposite end. Therefore as the bridge 12 and the carriage 24 are effectively raised during movement from the leg structure 14 towards the leg structure 16, the carriage 24 is lowered through a vertical distance due to the angle of the bridge 12, and thus the height of the platform 24 above the base 10 can remain constant.

There is thus provided a simple mechanical arrangement for compensating for the varying forces due to the displacement of the carriage on the bridge, such an arrangement having considerable advantages over the conventional arrangement where a counterbalance weight for the carriage is provided on the bridge structure to move in a direction opposite to the direction of movement of the carriage. This conventional arrangement results in considerably increased weight of the combined bridge structure and carriage which has to be moved and also results in an extremely bulky machine. Increase in bulk also requires of course increase in space for the machine and space generally should desirably be kept to a minimum.

Various modifications may be made without departing from the invention. For example the spindle and lever arrangement may be other than that described and other forms of drive for the spindle may be utilised provided movement is in accordance with movement of the carriage. Further the location of the compensating arrangement may differ from that described provided movement is transmitted from the chain to the leg support structure.

Whilst endeavouring in the foregoing Specification to draw attention to those features of the invention believed to be of particular importance it should be understood that the applicant claims protection in respect of any patentable feature or combination of features hereinbefore referred to whether or not particular emphasis has been placed thereon.

I claim:

1. Apparatus for carrying machine elements, said apparatus comprising a base, a bridge structure comprising spaced support legs and a bridge extending therebetween, bearings mounting the support legs on the base, carriage means movable on the bridge, and means compensating for the effects on the bearings due to varying forces on the support legs resulting from movement of the carriage means, the compensating means comprising an arrangement effective at an end of the bridge structure for mechanically transmitting movement of the carriage means into a change in height of the bridge structure at or towards said end above the base, independent of variation of the pressure of the bearings.

2. Apparatus according to claim 1, wherein the bearings are air bearings.

3. Apparatus according to claim 1, wherein the compensating means is arranged to effect raising of the bridge structure at said end to offset the increase in force applied to the respective support legs when the carriage means is moved towards said end.

4. Apparatus according to claim 3, wherein the bearings are air bearings.

5. Apparatus according to claim 4, wherein the compensating means is further arranged to offset raising of the bridge structure at the other end due to the respective air bearing when the carriage means is moved away from said other end.

6. Apparatus according to any of claims 3 to 5, wherein the bridge structure is downwardly angled from the other end towards said first mentioned end to offset the overall raising of the bridge structure.

7. Apparatus according to claim 1, wherein the compensating means comprises a flexible endless member movable together with the carriage means and effective to operate a rotary drive, the latter being operatively connected with a lever assembly which is pivotally connected with the respective support legs for the bridge structure and is effective to change the height of the bridge structure.

8. Apparatus according to claim 7, wherein the endless member comprises a chain movable on a path defined by sprockets.

9. Apparatus according to claim 7 or 8, wherein means is provided for tensioning the endless member.

* * * * *